ANGELINE UNDERWOOD.
Land-Pulverizer.
No. 160,129. Patented Feb. 23, 1875.
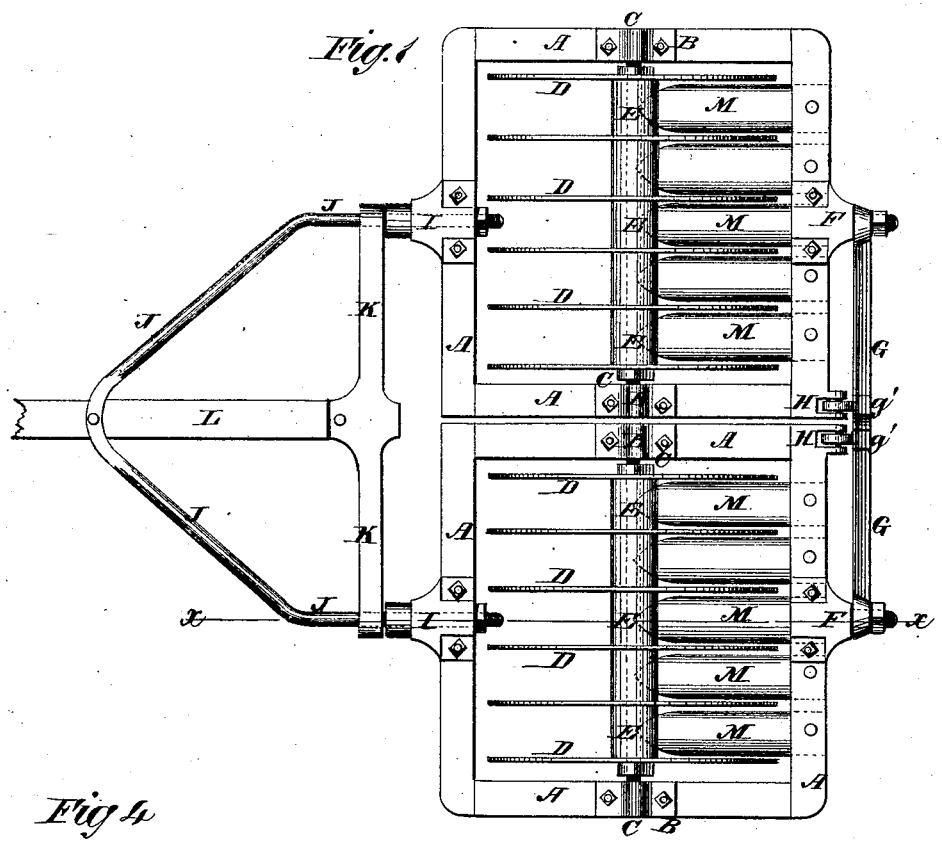
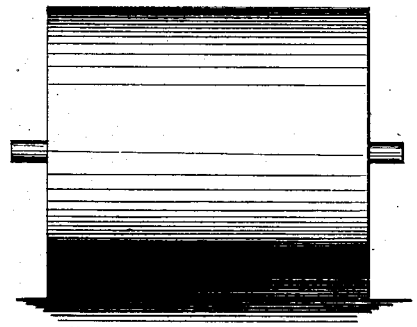
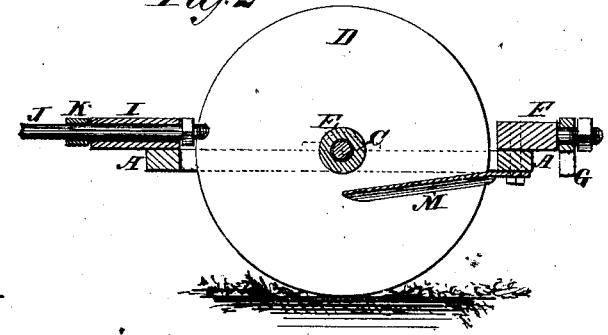
WITNESSES: Francis McArdle, A. F. Terry
INVENTOR: Mrs Angeline Underwood
BY [signature] ATTORNEYS
THE GRAPHIC CO.PHOTO-LITH.39 & 41 PARK PLACE,N.Y.

UNITED STATES PATENT OFFICE.

ANGELINE UNDERWOOD, OF CARROLLTON, ILLINOIS.

IMPROVEMENT IN LAND-PULVERIZERS.

Specification forming part of Letters Patent No. 160,129, dated February 23, 1875; application filed November 30, 1874.

*To all whom it may concern:*

Be it known that I, Mrs. ANGELINE UNDERWOOD, of Carrollton, in the county of Greene and State of Illinois, have invented a new and useful Improvement in Land-Pulverizer, of which the following is a specification:

Figure 1 is a top view of my improved machine. Fig. 2 is a detail section of the same taken through the line $x\ x$, Fig. 1. Fig. 3 is a detail view of the rear connecting-bar.

Similar letters of reference indicate corresponding parts.

My invention has for its object to furnish an improved machine for cutting in pieces and pulverizing clods, sods, and lumps in plowed land.

The invention consists in the combination and arrangement of parts as hereinafter described and claimed.

A are two strong wooden frames, which are placed side by side, and to the middle parts of the side bars of which are bolted bearings B for the journals of the shafts or rods C. Upon the shafts C are placed a number of circular disks or cutters, D, eighteen inches, more or less, in diameter, and about four inches apart. The cutters D are kept at the proper distance apart by tubular washers E, placed upon the said shafts between the said cutters. The cutters D and washers E are secured in place upon the shafts C by nuts screwed upon the said shaft at the outer sides of the outer cutters. To the middle parts of the rear bars of the frames A are attached castings F, to which are pivoted the ends of a connecting-bar, G, to hold the two frames A in proper relative position, while allowing them to incline freely in either direction to adjust themselves to any unevenness in the surface of the ground. The middle part of the bar G is widened, or has plates $g'$ attached to it for the small friction-rollers H to bear against to keep the frames from twisting when the machine is in use. The rollers H are pivoted to the inner rear corners of the frames A, or to castings attached to said corners. To the middle parts of the front side bars of the frames A are attached castings I, to which are pivoted the ends of the braces or hounds J, to which the ends of the cross-bar K of the tongue L are also attached. The tongue L is attached to the center of the cross-bar K and to the braces J. This construction allows the frames A to turn freely, and at the same time prevents the ends of the tongue cross-bar K from dropping down. To the rear bar of the frame A are attached scrapers M, of a width about equal to the width of the space between the cutters D, to scrape off any soil that may adhere to said cutters, and which might otherwise prevent the cutters from entering the ground to the required depth.

The cutters D are designed to enter the ground to the same depth as the plows, so as to cut in pieces all sods, clods, and lumps that may have been turned under by said plow. The cutters D also cut into short pieces all grass, weeds, and stalks that may have been covered by the plow, so that they will not interfere with the operation of the seed drill or planter.

After the ground has been sufficiently operated upon by the cutters they may be detached and replaced by rollers, and the ground may be rolled.

A proper form of roller for this purpose is shown in Fig. 4.

Having thus described my invention, I claim as new and desire to secure by Letters Patent—

1. In a land-pulverizing machine, the combination, with the pivoted oscillating frames A A, having friction-rollers H, of the bar G, having bearing-plates $g'$, as and for the purpose specified.

2. The bent or V-shaped rods J, connected to the pole L and bar K to form hounds or braces, and extended rearwardly through the castings I and front bar of the oscillating frames A to form the pivots or journals thereof, as shown and described.

ANGELINE UNDERWOOD.

Witnesses:
GEO. W. WINN,
RICHARD B. WINN.